United States Patent
Kuroki (10) Patent No.: US 10,642,246 B2
(45) Date of Patent: May 5, 2020

(54) NUMERICAL CONTROLLER FOR CORRECTING SPEED FEEDFORWARD GAIN OF MACHINE

(71) Applicant: FANUC CORPORATION, Minamitsuru-gun, Yamanashi (JP)

(72) Inventor: Hideki Kuroki, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 0 days.

(21) Appl. No.: 15/825,701

(22) Filed: Nov. 29, 2017

(65) Prior Publication Data

US 2018/0150050 A1    May 31, 2018

(30) Foreign Application Priority Data

Nov. 29, 2016  (JP) .................. 2016-231208

(51) Int. Cl.
*G05B 19/404*  (2006.01)
*G05B 19/402*  (2006.01)
*G05B 19/416*  (2006.01)
*G05B 19/414*  (2006.01)

(52) U.S. Cl.
CPC ......... *G05B 19/404* (2013.01); *G05B 19/402* (2013.01); *G05B 19/4166* (2013.01); *G05B 19/414* (2013.01)

(58) Field of Classification Search
None
See application file for complete search history.

(56) References Cited

U.S. PATENT DOCUMENTS

| | | | |
|---|---|---|---|
| 6,295,484 B1* | 9/2001 | Ojima | B25J 9/163 700/245 |
| 2006/0087275 A1* | 4/2006 | Sato | G05B 19/416 318/623 |
| 2013/0173045 A1* | 7/2013 | Kawana | G05B 19/404 700/186 |
| 2015/0045940 A1 | 2/2015 | Takeuchi et al. | |
| 2017/0017058 A1* | 1/2017 | Sumioka | H02N 2/142 |

FOREIGN PATENT DOCUMENTS

| | | |
|---|---|---|
| JP | 0540528 A | 2/1993 |
| JP | 06266425 A | 9/1994 |
| JP | 11184512 A | 7/1999 |
| JP | 2003-022106 A | 1/2003 |
| JP | 2003005838 A | 1/2003 |
| JP | 2008-225825 A | 9/2008 |
| JP | 44-10002 B2 | 2/2010 |
| JP | 2013182586 A | 9/2013 |

OTHER PUBLICATIONS

Notification of Reasons for Refusal for Japanese Application No. 2016-231208, dated Apr. 17, 2018 with translation, 9 pages.

* cited by examiner

*Primary Examiner* — Mohammad Ali
*Assistant Examiner* — Vincent W Chang
(74) *Attorney, Agent, or Firm* — RatnerPrestia (57) ABSTRACT

A numerical controller is provided with a speed feedforward gain correction unit configured to obtain an associated axis, which is subject to a varying load applied to a particular axis according to a coordinate value, and a correction coefficient of the particular axis corresponding to the current coordinate value of the associated axis, based on a correction coefficient storage unit, and correct a speed feedforward gain for speed feedforward control of the particular axis, and a motor control unit configured to control the particular axis based on the corrected speed feedforward gain.

5 Claims, 7 Drawing Sheets

NUMERICAL CONTROLLER FOR CORRECTING SPEED FEEDFORWARD GAIN OF MACHINE

CROSS-REFERENCE TO RELATED APPLICATIONS

This application is a new U.S. Patent Application that claims benefit of Japanese Application No. 2016-231208, filed Nov. 29, 2016, the disclosure of this application being incorporated herein by reference in its entirety for all purposes.

BACKGROUND OF THE INVENTION

Field of the Invention

The present invention relates to a numerical controller, and more particularly, to a numerical controller having a function of correcting speed feedforward by machine coordinate values of associated axes.

Description of the Related Art

A machine such as a machine tool generally has a plurality of axes and machines a workpiece by controlling these axes. The machine tools shown in FIGS. 6 and 7 are examples of the machine having a plurality of axes.

Figure 6:
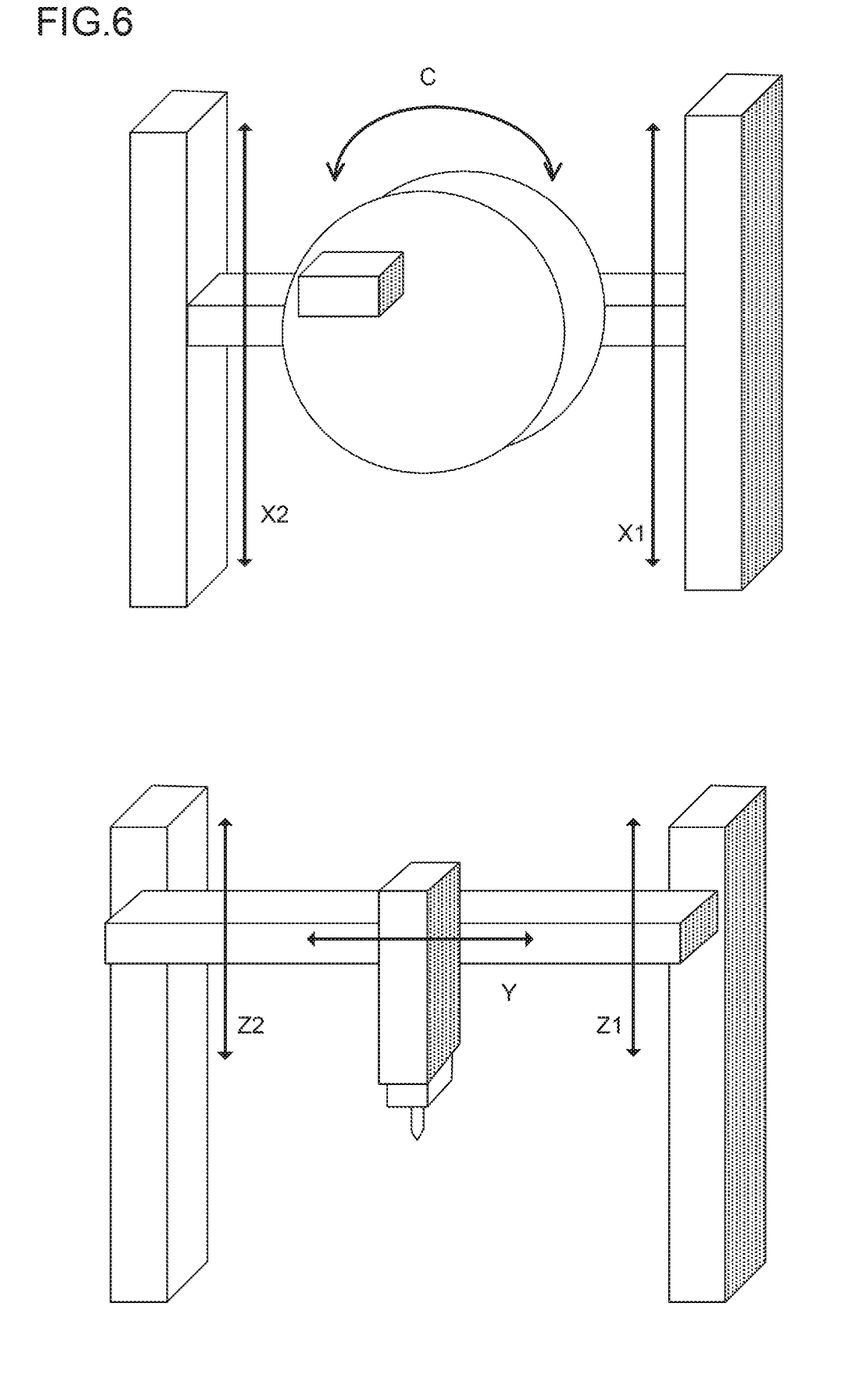
FIG. 6 is a diagram (1) showing an example of a machine tool having a plurality of axes.

In the machine shown in the upper part of FIG. 6, a rotary table fitted with an attachment in a position separate from a rotation axis (C-axis) is supported by a horizontal support portion, which is attached to left and right gateposts for movement in the X-axis direction. On the other hand, the machine shown in the lower part of FIG. 6 comprises a horizontal support portion, which supports a spindle for movement in the Y-axis direction, and gateposts, which support the horizontal support portion for movement in the Z-axis direction (Japanese Patent Application Laid-Open No. 2003-022106).

Figure 7:
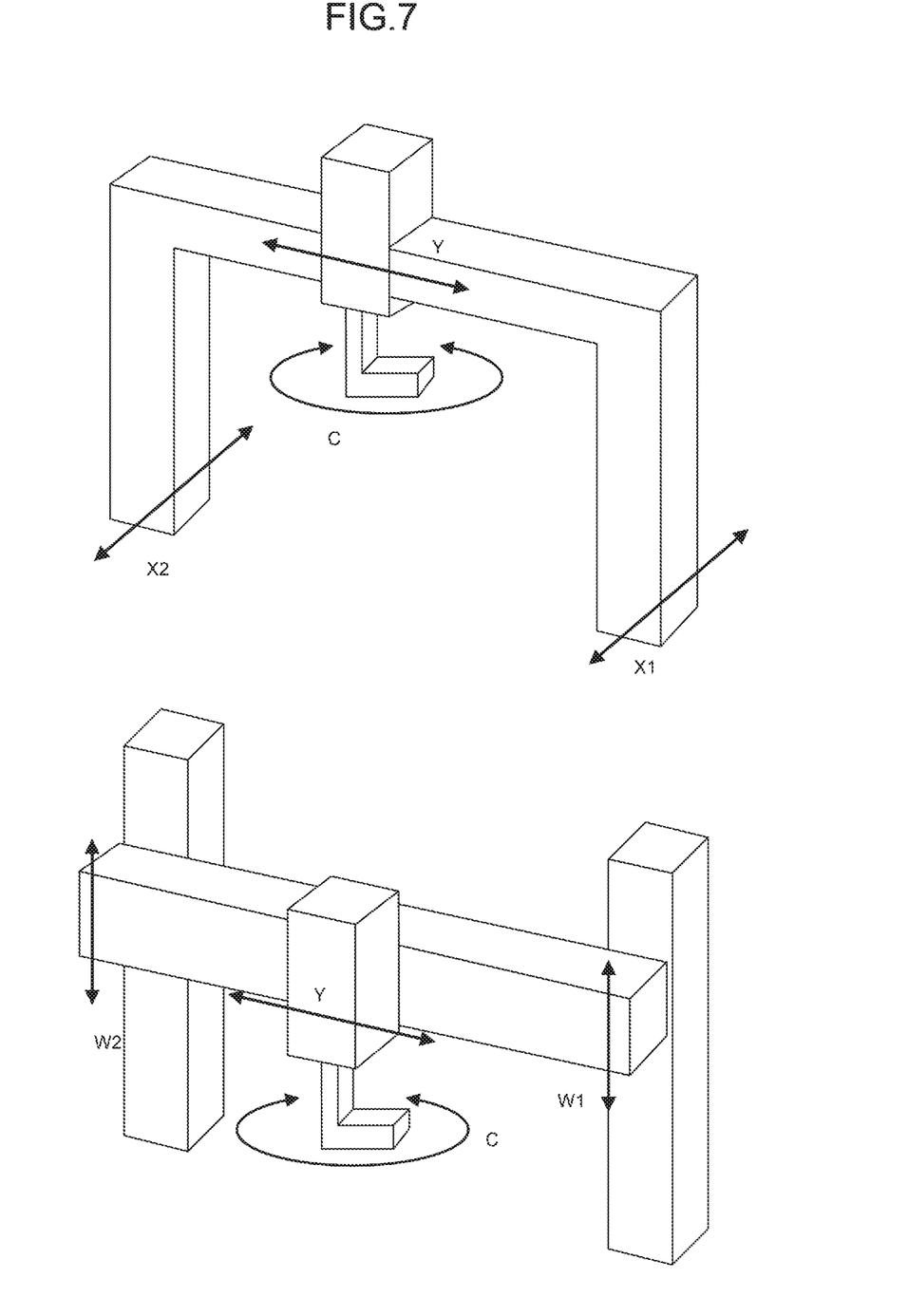
FIG. 7 is a diagram (2) showing another example of the machine tool having a plurality of axes.

The machine shown in the upper part of FIG. 7 comprises a support portion supporting a hook-shaped tool for rotation about a rotation axis (C-axis) and portal support portions supporting that support portion for movement in the Y-axis direction, the portal support portions being movable in the X-axis direction (Japanese Patent No. 4410002). On the other hand, the machine shown in the lower part of FIG. 7 comprises a support portion supporting a hook-shaped tool for rotation about a rotation axis (C-axis) and a horizontal support portion supporting that support portion for movement in the Y-axis direction and attached to left and right gateposts for movement in the W-axis direction (Japanese Patent Application Laid-Open No. 2008-225825).

Figure 8:
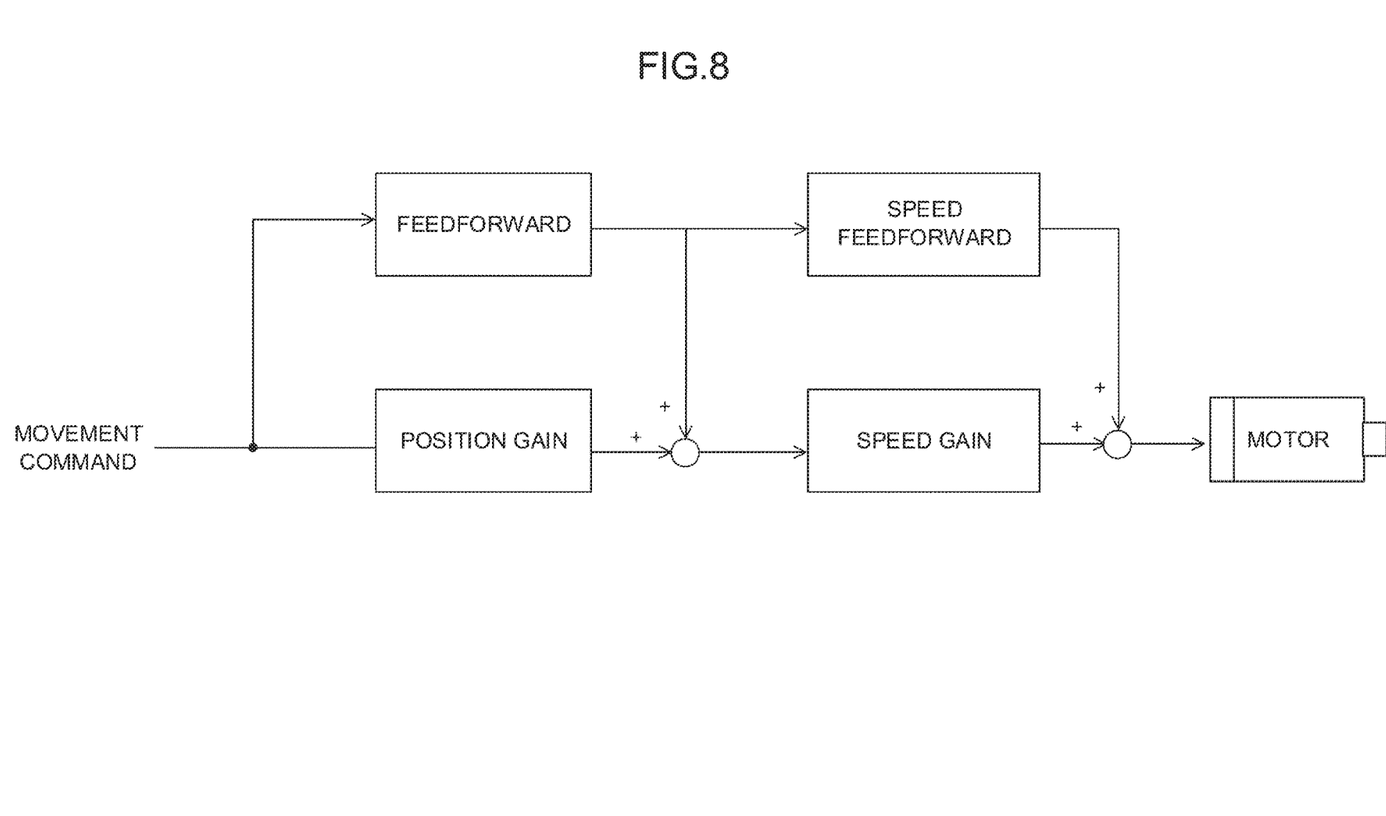
FIG. 8 is a diagram illustrating speed feedforward control.

On the other hand, axes of the machine are driven by a motor that is controlled by a move command output by a control device. While the motor is controlled so as to move at a speed commanded by speed feedback control (speed control loop), speed feedforward control is further performed, as shown in FIG. 8, in order to reduce a tracking delay (delay in response of the speed control loop) that is caused by the drive of the machine axes. The speed feedforward control is performed based on a speed feedforward gain for each of the axes set so that their respective motions are aligned.

In some machine configurations, however, loads on the individual axes are not self-contained and sometimes may vary depending on the positions of other axes. In the machine shown in the upper part of FIG. 6, for example, the positions of structures for X1- and X-2 axes change as the C-axis rotates, so that loads acting individually on the X1- and X-2 axes change depending on the position of the C-axis. Likewise, in the machine shown in the lower part of FIG. 6, loads acting individually on Z1- and Z-2 axes change depending on the position of the Y-axis. Moreover, in the machine shown in the upper part of FIG. 7, loads acting individually on the X1- and X-2 axes change depending on the respective positions of two axes, the C- and Y-axes. The same applies to the machine shown in the lower part of FIG. 7.

Thus, in an environment where the loads on the axes vary, the delay in response of the speed control loop also varies due to the load variation. If the speed feedforward gain set for each axis is used as it is in the speed feedforward control, therefore, the motions of the individual axes cannot be aligned, so that the workpiece to be machined may suffer a shape error or the operation of the machine may be subject to vibration, in some cases.

SUMMARY OF THE INVENTION

Accordingly, the object of the present invention is to provide a numerical controller having a function of correcting speed feedforward by machine coordinate values of associated axes.

A numerical controller of the present invention has a function of registering, as associated axes, those axes which are associated with loads acting on individual axes and setting correction coefficients corresponding to machine coordinate values of the associated axes. The above-described problems are solved by adjusting speed feedforward by multiplying a speed feedforward gain of an axis by the correction coefficients corresponding to the machine coordinate values of the associated axes, in speed feedforward control.

A numerical controller according to the present invention, which controls a machine having a plurality of axes, comprises a correction coefficient storage unit stored with an associated axis, which is one of the plurality of axes for a predetermined or particular axis among the plurality of axes and is subject to a varying load applied to the particular axis according to the coordinate value of the axis concerned, and a correction coefficient corresponding to the coordinate value of the associated axis for correcting a speed feedforward gain for speed feedforward control of the particular axis, in association with each other; a speed feedforward gain correction unit configured to obtain the correction coefficient of the particular axis corresponding to the current coordinate value of the associated axis, based on the correction coefficient storage unit, and correct the speed feedforward gain for the speed feedforward control of the particular axis by the obtained correction coefficient; and a motor control unit configured to control the particular axis based on the corrected speed feedforward gain.

The numerical controller according to the present invention further comprises an associated-axis registration unit configured to register the associated axis for the particular axis into the correction coefficient storage unit.

The numerical controller according to the present invention further comprises a correction coefficient setting unit configured to set the correction coefficient corresponding to the coordinate value of the associated axis in the correction coefficient storage unit.

In the numerical controller according to the present invention, the correction coefficient setting unit commands the motor control unit to move the particular axis registered in the correction coefficient storage unit with the associated axis for the particular axis moved to a predetermined coordinate and obtains the correction coefficient in the predetermined coordinate for the associated axis by adjusting the speed feedforward gain of the particular axis while monitoring a feedback of the particular axis from the motor control unit. In the numerical controller according to the present invention, the correction coefficient storage unit is registered with a plurality of associated axes for each single axis, and the speed feedforward gain correction unit obtains the correction coefficient based on the respective coordinate values of the plurality of associated axes registered for the particular axis and corrects the speed feedforward gain for the speed feedforward control of the particular axis by the obtained correction coefficient.

According to the present invention, control can be performed in consideration of the influence from associated axes due to a machine configuration, and therefore, improvement of the machining shape accuracy can be expected.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

First Embodiment

Figure 1:
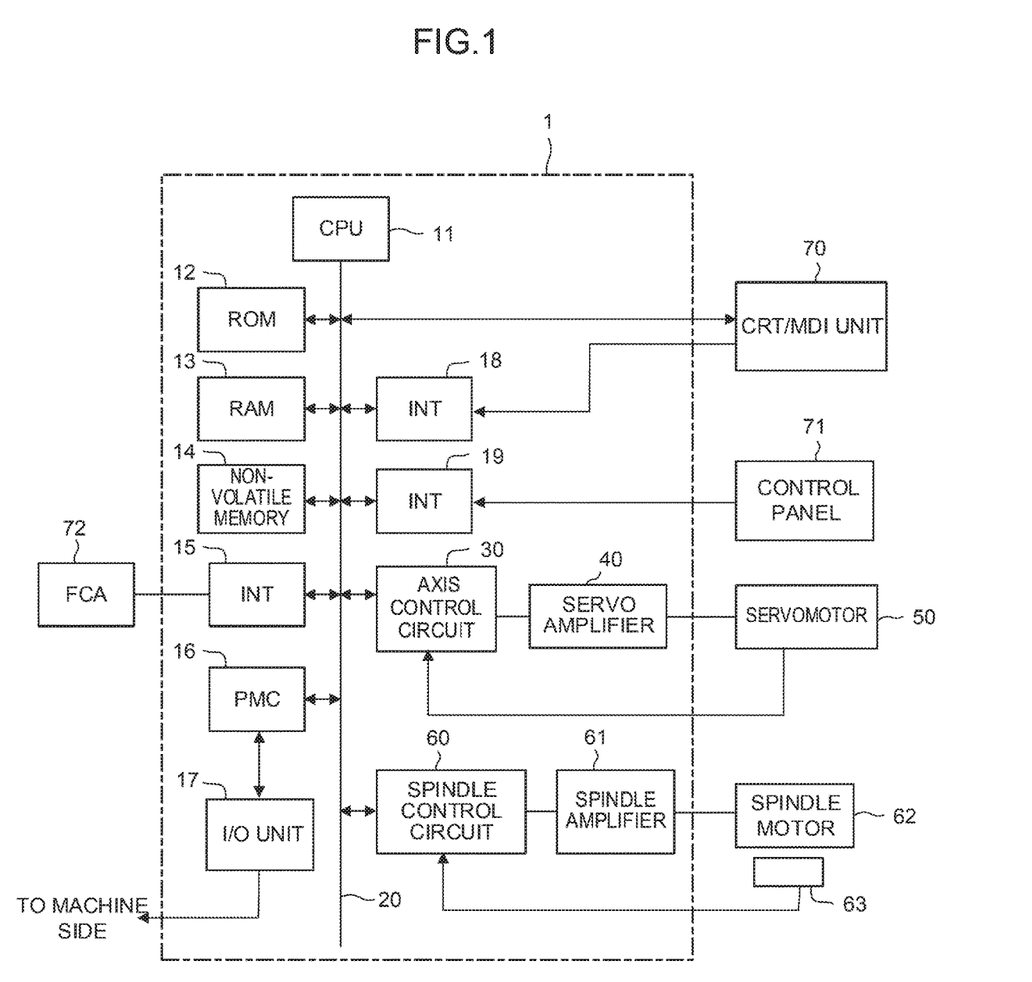
FIG. 1 is a schematic hardware configuration diagram of a numerical controller according to a first embodiment of the present invention.

FIG. 1 is a hardware configuration diagram showing principal parts of a numerical controller 1 according to one embodiment of the present invention. A CPU 11 of the numerical controller 1 is a processor for generally controlling the numerical controller 1. The CPU 11 reads out a system program in a ROM 12 through a bus 20 and generally controls the numerical controller 1 according to this system program. A RAM 13 is loaded with temporary calculation data and display data, various data input by an operator through a CRT/MDI unit 70, and the like.

A non-volatile memory 14 is constructed as a memory that is, for example, backed up by a battery (not shown) so that its storage state can be maintained even when the numerical controller 1 is turned off. The non-volatile memory 14 is stored with a machining program read in through an interface 15 and a machining program (described later) input through the CRT/MDI unit 70. While the non-volatile memory 14 is further stored with programs for machining program operation processing used to run the machining programs, these stored programs are expanded in the RAM 13 at the time of execution. Moreover, various system programs for performing edit mode processing and the like needed to create and edit the machining programs are previously written in the ROM 12.

The interface 15 is an interface for connecting the numerical controller 1 and external equipment 72 such as an adapter. The machining programs and various parameters are read in from the side of the external equipment 72. Moreover, the machining programs edited in the numerical controller 1 can be stored into an external storage means through the external equipment 72. A PMC (programmable machine controller) 16 controls peripheral devices (e.g., an actuator such as a robot hand for tool change) of the machine tool by outputting signals to them through an I/O unit 17 according to a sequential program stored in the numerical controller 1. Furthermore, on receiving signals from various switches on a control panel on the main body of the machine tool, the PMC 16 processes the signals as required and delivers them to the CPU 11.

The CRT/MDI unit 70 is a manual data input unit equipped with a display, keyboard and the like. An interface 18 receives commands and data from the keyboard of the CRT/MDI unit 70 and delivers them to the CPU 11. An interface 19 is connected to a control panel 71 equipped with a manual pulse generator and the like.

An axis control circuit 30 for controlling axes of the machine tool receives a movement command amount of each axis from the CPU 11 and outputs a movement command for the axis to a servo amplifier 40. On receiving this command, the servo amplifier 40 drives a servomotor 50 for moving the axis of the machine tool. The servomotor 50 for the axis has a pulse coder (not shown) built-in, and a feedback signal from this pulse coder is fed back to the axis control circuit 30 to perform feedback control. In the hardware configuration diagram of FIG. 1, the axis control circuit 30, servo amplifier 40, and servomotor 50 are each shown as being only one in number. Actually, however, these elements are provided corresponding in number to the axes of the machine tool.

A spindle control circuit 60 receives a spindle rotation command for the machine tool and outputs a spindle speed signal to a spindle amplifier 61. On receiving this spindle speed signal, the spindle amplifier 61 rotates a spindle motor 62 of the machine tool at a specified rotational speed, thereby driving a tool.

A position coder 63 is connected to the spindle motor 62 by means of gears, a belt or the like. The position coder 63 outputs feedback pulses in synchronism with the rotation of a spindle and the feedback pulses are read by the CPU 11.

Figure 2:
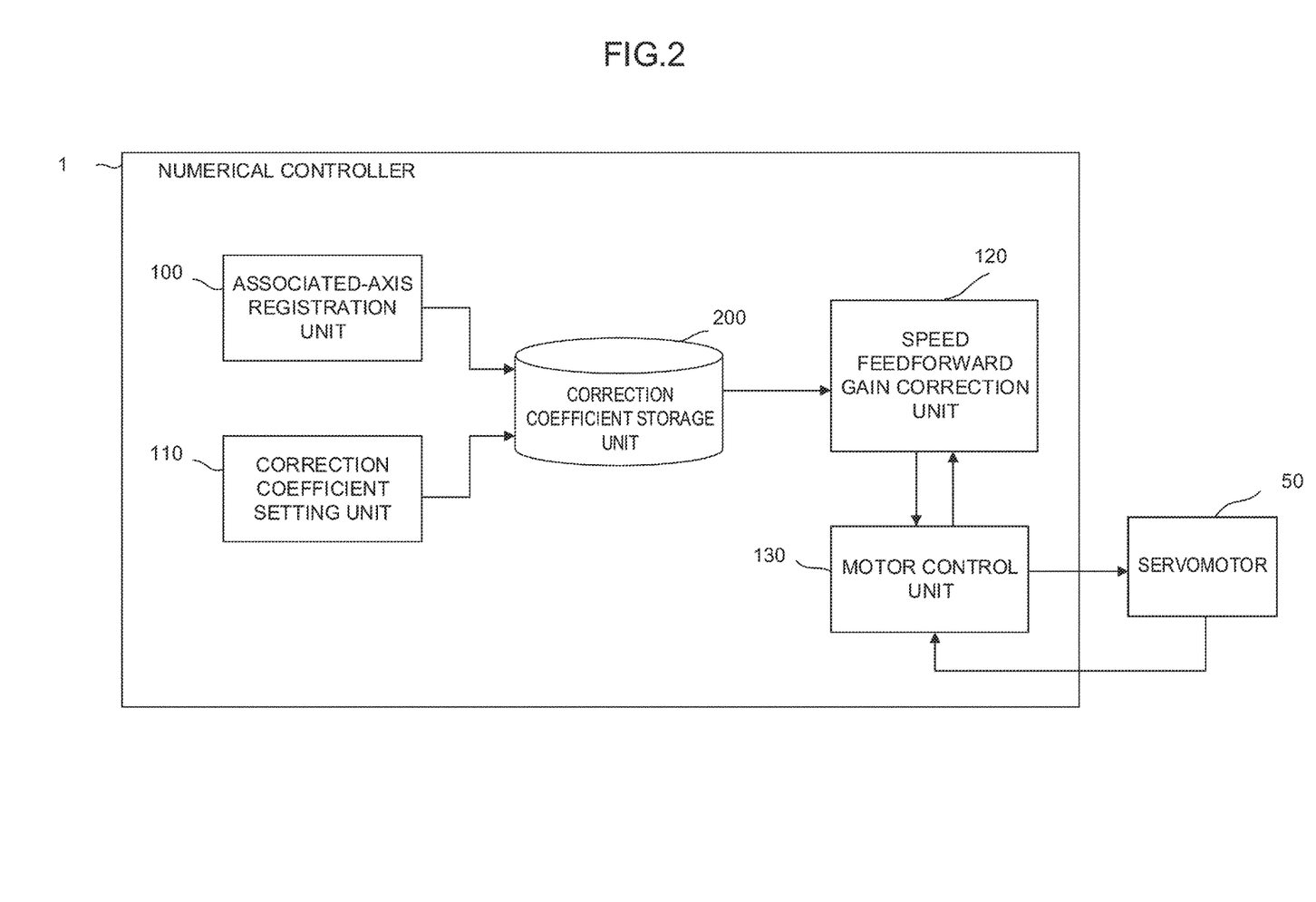
FIG. 2 is a schematic functional block diagram of the numerical controller according to the first embodiment of the present invention.

FIG. 2 shows a schematic functional block diagram for a case where the numerical controller 1 shown in FIG. 1 is mounted with a speed feedforward compensation function according to the present invention. Each of function means shown in FIG. 2 can be obtained as the CPU 11 shown in FIG. 1 performs the system program to provide each function. The numerical controller 1 of the present embodiment comprises an associated-axis registration unit 100, correction coefficient setting unit 110, speed feedforward gain correction unit 120, and motor control unit 130.

The associated-axis registration unit 100 is a function means for registering associated axes that are associated with loads on individual axes (hereinafter referred to as the particular axes). As for examples of axes associated with the particular axes, the axis associated with a particular axis X1 is the C-axis, and the axis associated with a particular axis X2 is also the C-axis, in the case of the machine shown in the upper part of FIG. 6, for example. The registration of the particular axes in association with the associated axes may be performed in such a manner that a list of the particular axes to be controlled is displayed for a user and the associated axes are input for the individual particular axes. Alternatively, information on the associated axes for the particular axes that are registered in advance in an external storage device may be enabled to be read in and registered, or information on the associated axes for the particular axes that are set in advance in the machine to be controlled may be enabled to be read in and registered. The associated-axis registration unit 100 registers the information on the associated axes for the particular axes into a correction coefficient storage unit 200.

Figure 3:
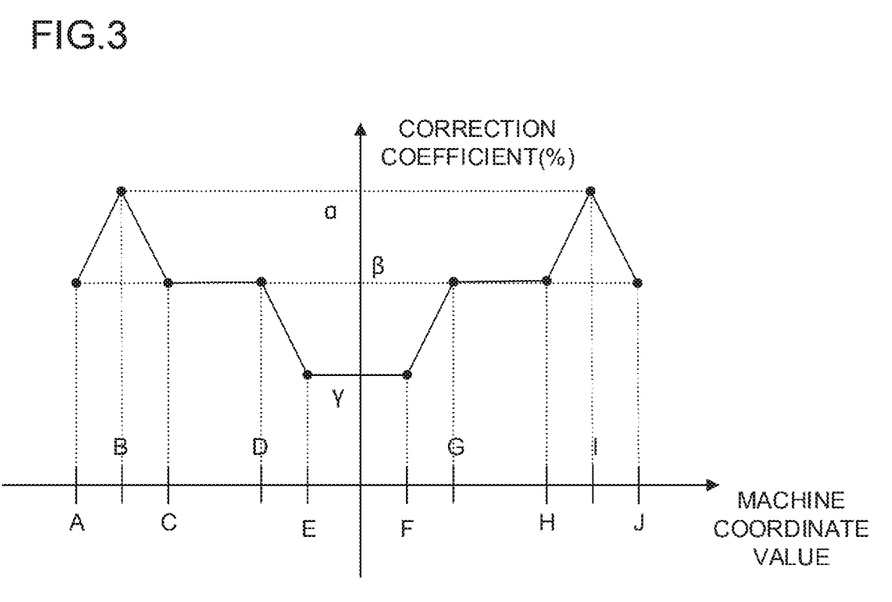
FIG. 3 is a diagram showing examples of correction coefficients corresponding to the machine coordinate values of associated axes.

The correction coefficient setting unit 110 is a function means for setting a correction coefficient of a speed feedforward gain at an arbitrary machine coordinate value for the associated axes for the individual particular axes registered into the correction coefficient storage unit 200 by the associated-axis registration unit 100. In the numerical controller 1 of the present embodiment, the correction coefficient of an appropriate speed feedforward gain is set by the correction coefficient setting unit 110 after it is obtained in advance by an experiment or the like. The correction coefficient of the speed feedforward gain can be obtained by a method in which the particular axes are activated with the associated axes located corresponding to predetermined machine coordinate values (A to J of FIG. 3), the speed feedforward gain of the particular axes is increased without causing vibration while monitoring the then motor feedback, and a value obtained by dividing the maximum value of the speed feedforward gain free from the occurrence of vibration of the particular axes by a normal speed feedforward gain is set as the correction coefficient for the machine coordinate values of the associated axes. Moreover, the correction coefficient of the speed feedforward gain can be obtained by another method in which the particular axes are activated by moving the associated axes to their respective predetermined machine coordinate values (A to J of FIG. 3) with the normal speed feedforward gain set as it is, the correction coefficient at the machine coordinate value with a minimum positional deviation relative to the movement command is set at 100% while monitoring the then motor feedback, and the correction coefficient is changed so that the positional deviation approaches the positional deviation at the machine coordinate value with the correction coefficient of 100% without causing vibration at other machine coordinate values. Based on these methods, it is necessary only that correction coefficients for some typical machine coordinate values of the associated axes be obtained and the correction coefficient setting unit 110 cover the correction coefficients for the intermediate machine coordinate values by performing straight-line or linear interpolation processing. The correction coefficient setting unit 110 sets the correction coefficient of the speed feedforward gain at the arbitrary machine coordinate value for the associated axes for the particular axes in the correction coefficient storage unit 200.

The speed feedforward gain correction unit 120 obtains the correction coefficient of the speed feedforward gain, based on the correction coefficient of the speed feedforward gain at the machine coordinate value of each of the associated axes for the individual particular axes stored in the correction coefficient storage unit 200 and the machine coordinate value of each servomotor 50 acquired from the motor control unit 130 (described later), and outputs the obtained correction coefficient to the motor control unit 130.

The motor control unit 130 is a function means that is implemented as the CPU controls the axis control circuit 30 shown in FIG. 1 and serves to manage the machine coordinate value, speed and the like of the servomotor 50 based on the feedback from the servomotor 50 and control the position and speed of the servomotor 50 based on a movement command received from a control unit (not shown). In controlling the servomotor 50, the motor control unit 130 corrects the speed feedforward gain for speed feedforward control of the servomotor 50 corresponding to each individual particular axis by multiplying it by the correction coefficient of the speed feedforward gain for the particular axis received from the speed feedforward gain correction unit 120.

According to the first embodiment described above, the speed feedforward gain is corrected according to the machine coordinate values of the associated axes for the particular axes that receive a varying load depending on the machine coordinate values of the associated axes, so that control can be performed in consideration of the influence from the associated axes due to the machine configuration, and therefore, improvement of the machining shape accuracy can be expected.

Second Embodiment

A numerical controller 1 according to a second embodiment of the present invention performs the correction of the speed feedforward gain of a particular axis in consideration of a plurality of associated axes in controlling a machine with the associated axes for the particular axis, as shown in the upper and lower parts of FIG. 7. The configuration of the numerical controller 1 of the present embodiment is the same as that of the first embodiment described with reference to FIGS. 1 and 2 except for the functions of some of the function means.

An associated-axis registration unit 100 of the present embodiment is configured to be able to register a plurality of associated axes for each individual particular axis. Moreover, a correction coefficient setting unit 110 of the present embodiment is configured to be able to set the correction coefficient described in connection with the first embodiment for each of the associated axes registered for the particular axis.

A speed feedforward gain correction unit 120 of the present embodiment obtains correction coefficients from the machine coordinate values of a plurality of associated axes, if any, for the particular axis and calculates the correction coefficient of the speed feedforward gain of the particular axis by multiplying the obtained plurality of correction coefficients. As shown in the upper part of FIG. 7, if both the Y- and C-axes are registered as the associated axes for the particular axis X1, for example, the speed feedforward gain correction unit 120 acquires the correction coefficient set at the machine coordinate value of the Y-axis for the particular axis X1 and the correction coefficient set at the machine coordinate value of the C-axis with reference to the correction coefficient storage unit 200, and calculates the correction coefficient of the speed feedforward gain of the particular axis X1 by multiplying the acquired correction coefficients for the Y- and C-axes.

According to the second embodiment described above, the speed feedforward gain is corrected according to the machine coordinate values of the associated axes for the particular axes that receive a varying load depending on the machine coordinate values of the plurality of associated axes, so that control can be performed in consideration of the influence from the associated axes due to the machine configuration, and therefore, improvement of the machining shape accuracy can be expected.

Third Embodiment

Figure 4:
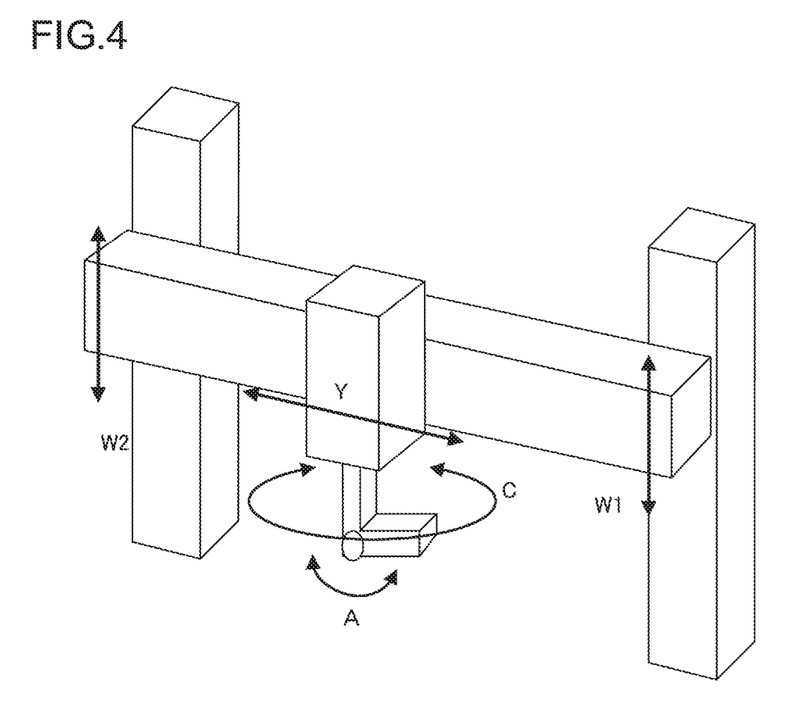
FIG. 4 is a diagram showing an example of a machine constructed so that loads on particular axes corresponding to the machine coordinate values of an associated axis change with the machine coordinate values of another associated axis.

A numerical controller 1 according to a third embodiment of the present invention performs the correction of the speed feedforward gain of a particular axis in consideration of a plurality of associated axes in controlling a machine with the associated axes for the particular axis. As shown in FIG. 4, the present embodiment is configured to deal with a case where a correction coefficient corresponding to the machine coordinate value of a specific associated axis (C-axis) changes with the machine coordinate value of another associated axis (A-axis). The configuration of the numerical controller 1 of the present embodiment is the same as that of the first embodiment described with reference to FIGS. 1 and 2 except for the functions of some of the function means.

An associated-axis registration unit 100 of the present embodiment is configured to be able to register a plurality of associated axes for each individual particular axis, and moreover, to register some or all of a plurality of associated axes as a composite associated axis.

A correction coefficient setting unit 110 of the present embodiment is configured to be able to set the correction coefficient described in connection with the first embodiment for each of the associated axes registered for the particular axis. Moreover, the correction coefficient setting unit 110 of the present embodiment is configured to be able to set the correction coefficient for a combination of machine coordinate values of a plurality of associated axes that are registered as a composite associated axis. If the A- and C-axes are registered as the composite associated axis for the machine with the configuration shown in FIG. 4, for example, the correction coefficient setting unit 110 sets the correction coefficient for each of a plurality of combinations of the respective machine coordinate values of the A- and C-axes. The correction coefficient setting unit 110 covers machine coordinate values between input machine coordinate values by performing interpolation processing (curvilinear surface interpolation processing or the like). The correction coefficients for the sets of machine coordinate values of the composite associated axis should only be obtained by the same method as that described in connection with the first embodiment after experimentally setting the individual associated axes to predetermined machine coordinate value in advance.

If a plurality of associated axes are provided for each particular axis, the numerical controller 1 according to the present embodiment obtains the correction coefficients from the machine coordinate values of the individual associated axes and calculates the correction coefficient of the speed feedforward gain of the particular axis by multiplying the obtained correction coefficients. Moreover, if the composite associated axis is provided for the particular axis, the numerical controller 1 according to the present embodiment calculates the correction coefficient of the speed feedforward gain of the particular axis by multiplying correction coefficients obtained from other associated axes by correction coefficients obtained based on the sets of machine coordinate values of the composite associated axis. As shown in FIG. 4, if the Y-axis is registered as an associated axis for a particular axis W1 and if the A- and C-axes are registered as a composite associated axis, for example, the speed feedforward gain correction unit 120 acquires the correction coefficient set at the machine coordinate value of the Y-axis for the particular axis W1 and the correction coefficients set at the sets of machine coordinate values of the A- and C-axes with reference to the correction coefficient storage unit 200, and calculates the correction coefficient of the speed feedforward gain of the particular axis W1 by multiplying the acquired correction coefficients for the Y-axis (associated axis) and the A- and C-axes (composite associated axis).

According to the third embodiment described above, the speed feedforward gain is corrected according to the machine coordinate values of the associated axes for the particular axes that receive a varying load depending on the machine coordinate values of the plurality of associated axes, and moreover, the machine coordinate value of another associated axis can be used to deal with the associated axes that apply a varying load to the particular axes. Thus, control can be performed in consideration of the influence from the associated axes due to the machine configuration, and therefore, improvement of the machining shape accuracy can be expected.

Fourth Embodiment

A numerical controller 1 according to a fourth embodiment of the present invention has a function of automatically setting a correction coefficient corresponding to the machine coordinate value of an associated axis for a particular axis. The hardware configuration of the numerical controller 1 of the present embodiment is the same as that of the first embodiment described with reference to FIG. 1.

Figure 5:
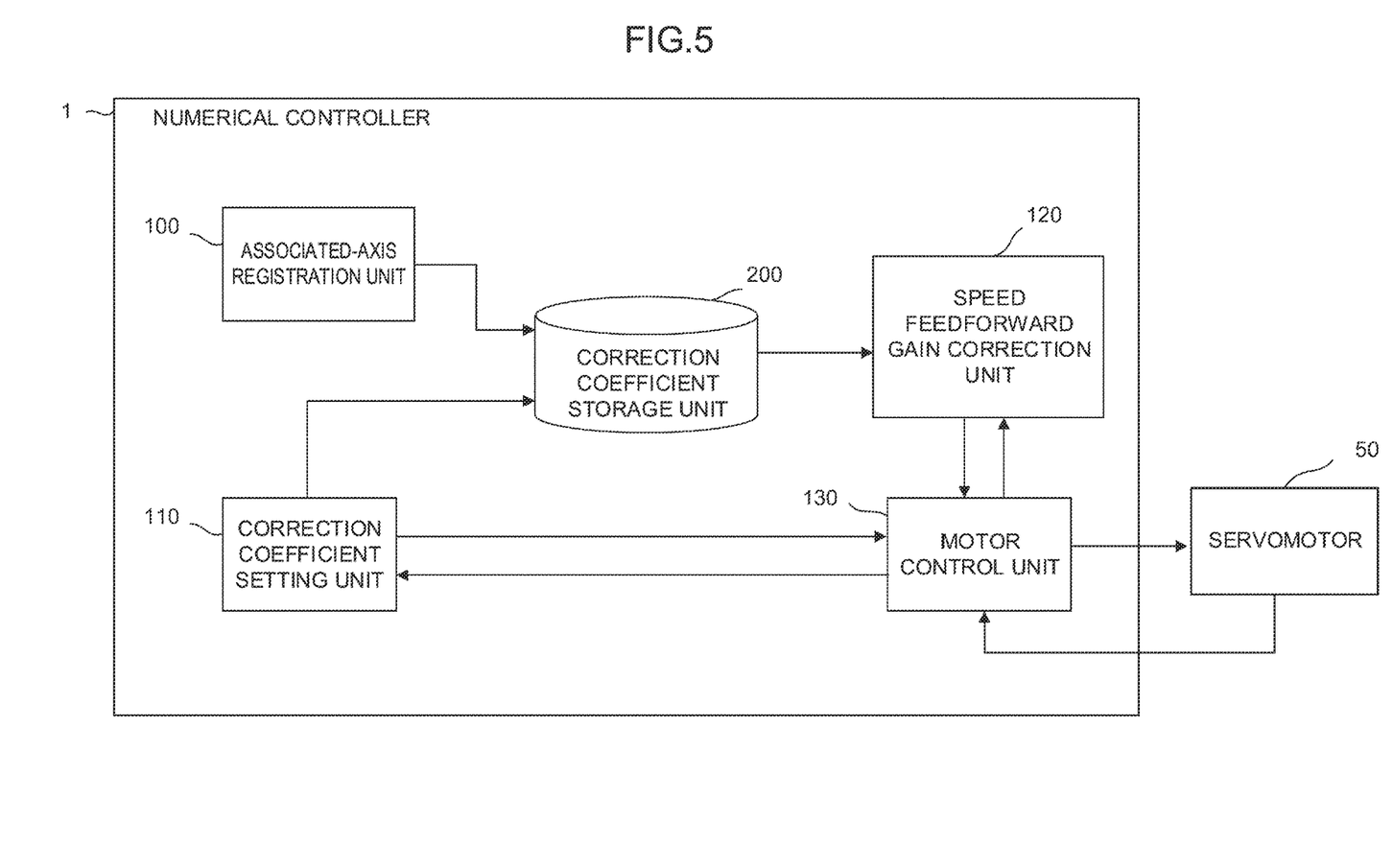
FIG. 5 is a schematic functional block diagram of a numerical controller according to a fourth embodiment of the present invention.

FIG. 5 shows a schematic functional block diagram of the numerical controller 1 of the present embodiment. The operations of individual function means of the numerical controller 1 of the present embodiment are the same as those of the first to third embodiments except that a correction coefficient setting unit 110 automatically sets the correction coefficient corresponding to the machine coordinate value of the associated axis for the particular axis based on a motor feedback.

The correction coefficient setting unit 110 of the present embodiment automatically sets correction coefficients corresponding to the machine coordinate values of associated axes for particular axes registered in a correction coefficient storage unit 200 by an associated-axis registration unit 100. The correction coefficient setting unit 110 obtains individual correction coefficients of the associated axes (including a composite associated axis) for a case where the associated axes are located corresponding to predetermined machine coordinate values (e.g., A to J of FIG. 3), with reference to the correction coefficient storage unit 200, and sets the obtained correction coefficients in the correction coefficient storage unit 200.

The correction coefficient setting unit 110 of the present embodiment may be configured, in obtaining the correction coefficient of the speed feedforward gain, to command the motor control unit 130 to locate the associated axes corresponding to the predetermined machine coordinate values (e.g., A to J of FIG. 3), activate the particular axes in this state, increase the speed feedforward gain of the particular axes without causing vibration while monitoring the then motor feedback, and set a value obtained by dividing the maximum value of the speed feedforward gain free from the occurrence of vibration of the particular axes by a normal speed feedforward gain as the correction coefficient for the machine coordinate values of the associated axes in the correction coefficient storage unit 200.

Moreover, the correction coefficient setting unit 110 may be configured to obtain the correction coefficient of the speed feedforward gain by another method. According to this method, the correction coefficient setting unit 110 commands the motor control unit 130 to activate the particular axes by moving the associated axes to their respective predetermined machine coordinate values (A to J of FIG. 3) with the normal speed feedforward gain set as it is, sets the correction coefficient at the machine coordinate value with a minimum positional deviation relative to the movement command at 100% while monitoring the then motor feedback, changes the correction coefficient so that the positional deviation approaches the positional deviation at the machine coordinate value with the correction coefficient of 100% without causing vibration at other machine coordinate values, and sets, in the correction coefficient storage unit 200, the correction coefficient with the positional deviation approached most closely as the correction coefficient for the respective machine coordinate values of the associated axes.

The correction coefficient setting unit 110 of the present embodiment thus obtains correction coefficients for some typical machine coordinate values of the associated axes and covers the correction coefficients for the intermediate machine coordinate values by performing interpolation processing (straight-line, linear, or curvilinear surface interpolation processing or the like). The correction coefficient setting unit 110 of the present embodiment may be configured to acquire from the motor control unit 130 the range of machine coordinate values in which the associated axes are movable and to automatically calculate the machine coordinate values at which the correction coefficients are obtained by, for example, dividing the range of the machine coordinate values into a predetermined number of equal sections.

While embodiments of the present invention have been described herein, the invention is not limited to the above-described embodiments and may be suitably modified and embodied in various forms.

The invention claimed is:

1. A numerical controller which controls a machine having a plurality of axes, the numerical controller comprising:
    a processor configured to:
        store a plurality of correction coefficients for correcting a speed feedforward gain for speed feedforward control along a first axis of a plurality of axes in a memory, the plurality of correction coefficients corresponding to a plurality of coordinate values along a second axis of the plurality of axes, the plurality of correction coefficients for the first axis are computed by:
        1) moving the machine along the first axis while increasing the speed feedforward gain to a maximum value free of vibration detected on the first axis while the machine is fixed at each of the plurality of coordinate values along the second axis,
        2) computing an adjusted value at each of the plurality of coordinate values along the second axis by adjusting the maximum value of the speed feedforward gain at each of the plurality of coordinate values along the second axis based on a normal value of the speed feedforward gain, and
        3) setting each of the plurality of correction coefficients as the adjusted value at each of the plurality of coordinate values along the second axis;
        obtain the correction coefficient of the first axis corresponding to the current coordinate value of the second axis, based on Information stored in the memory,
        correct the speed feedforward gain for the speed feedforward control of the first axis by the obtained correction coefficient; and
        control the first axis based on the corrected speed feedforward gain.

2. The numerical controller according to claim 1, wherein the processor is further configured to register the second axis for the first axis into the memory.

3. The numerical controller according to claim 1, wherein the processor is further configured to set the correction coefficient corresponding to the coordinate value of the second axis in the memory.

4. The numerical controller according to claim 3, wherein the processor is further configured to move the first axis registered in the memory with the second axis for the first axis moved to a predetermined coordinate and obtain the correction coefficient in the predetermined coordinate for the second axis by adjusting the speed feedforward gain of the first axis while monitoring a feedback of the first axis.

5. The numerical controller according to claim 1, wherein the memory is registered with a plurality of second axes for each of the first axes, and the processor is configured to obtain the correction coefficient based on the respective coordinate values of the plurality of second axes registered for the first axis and correct the speed feedforward gain for the speed feedforward control of the first axis by the obtained correction coefficient.

* * * * *